United States Patent

Ernst et al.

[11] 4,065,193
[45] Dec. 27, 1977

[54] THRUST BALL BEARING

[75] Inventors: Horst Manfred Ernst, Eltingshausen; Armin Olschewski, Schweinfurt; Rainer Schurger, Schwanfeld; Lothar Walter, Schweinfurt; Manfred Brandenstein, Aschfeld; Erich Burkl, Stammheim; Heinz Kiener, Waigolshausen, all of Germany

[73] Assignee: SKF Industrial Trading and Development Company, B.V., Nieuwegein, Netherlands

[21] Appl. No.: 693,510

[22] Filed: June 7, 1976

[30] Foreign Application Priority Data

July 9, 1975 Germany .............................. 7521786

[51] Int. Cl.² .............................................. F16D 23/00
[52] U.S. Cl. .................................. 308/233; 192/110 B
[58] Field of Search ............. 308/233; 192/98, 110 B, 192/111 A, 109 A

[56] References Cited

U.S. PATENT DOCUMENTS

| 3,847,258 | 11/1974 | Matyschik | 308/233 X |
| 3,885,658 | 5/1975 | Ernst et al. | 192/110 B X |

Primary Examiner—Joseph F. Peters, Jr.
Assistant Examiner—Gene A. Church
Attorney, Agent, or Firm—Daniel M. Rosen

[57] ABSTRACT

A thrust ball bearing has an outer cup-shaped ring and an inner cup-shaped ring. A ball bearing assembly of a plurality of balls and a cage is arranged between the closed ends of the bearing rings. The closed bottom of the outer ring is curved, with the center of curvature being on the side thereof toward the bearing assembly. The bearing rings have thin walls, and the thrust ball bearing is particularly adaptable for use as a clutch throw-out bearing.

11 Claims, 1 Drawing Figure

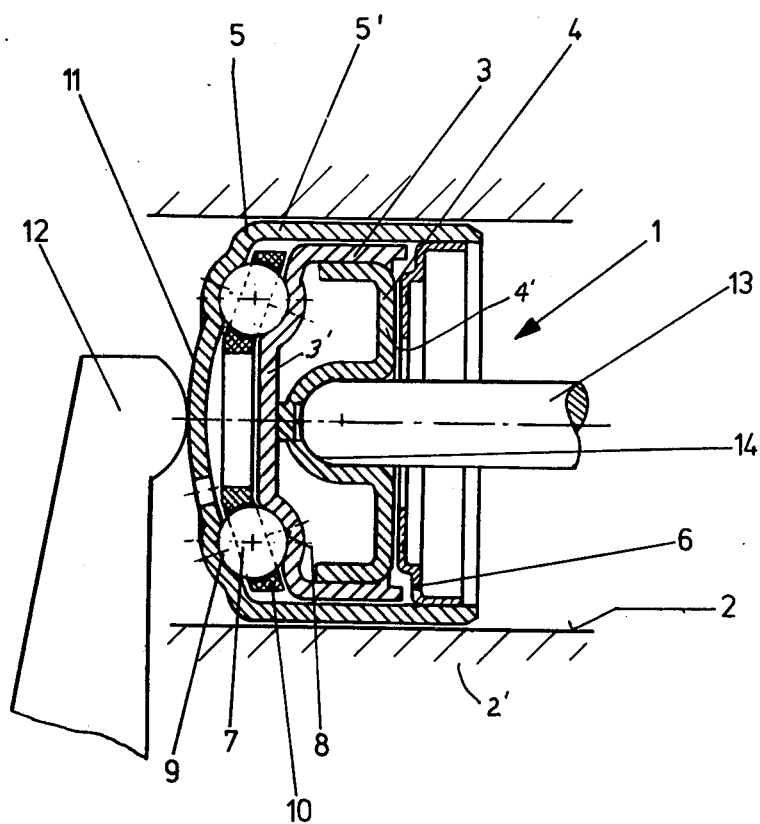

THRUST BALL BEARING

THE INVENTION

This invention relates to thrust ball bearings, and it is particularly directed to the provision of a thrust ball bearing formed of thin-walled bearing rings with at least one of the bearing rings being cup-shaped, that is, having a closed base.

Thrust ball bearings of this type are known, wherein a bearing assembly of rolling balls held by a cage is arranged between the bases of the two bearing rings. In these arrangements, the closed bases of the bearing rings are flat. The bearing rings are preferably formed by a technique which does not involve the removal of material, for example, by a drawing technique. Such thrust bearings are particularly adaptable for use as clutch throw-out bearings, wherein a clutch lever is mounted to engage the flat base surface of one of the bearing rings. The lever urges the bearing to move in the axial direction, to force a push rod engaging the other side of the bearing into contact with a clutch disk. In this arrangement, the flat base of the cup-shaped bearing ring can easily be deformed as a result of the force directed thereagainst by the lever. Such deformation results in the cracking or fracturing of the base. In some cases these cracks or fractures can advance as far as the race of the bearing, and can lead to damage and the consequent failure of the bearing.

The present invention is thereby directed to the provision of a thrust ball bearing of the above-described type, which, in spite of the use of thin-walled materials for the bearing rings, is suitably stiff and is capable of transmitting a greater axial force without danger of damage.

Briefly stated, in accordance with the invention, this objective is achieved by providing the essentially closed base of the bearing ring with a curved or spherical shape.

In order that the invention will be more clearly understood, it will now be disclosed in greater detail with reference to the accompanying drawing, wherein:

The single FIGURE of the drawing is a cross-sectional view of a thrust ball bearing in accordance with the invention, illustrated in combination with adjacent clutch elements for use as a clutch throw-out bearing.

Referring now to the drawing, the thrust bearing indicated generally by the reference numeral 1 is positioned to be movable axially in a bore 2 of a housing 2'. The bearing 1 is comprised of an inner ring 3 having a closed end 3', and a cup 4 inserted coaxially therein. The outer annular flange of the cup 4 radially engages the outer annular flange of the inner ring 3, and the closed end 4' of the cup 4 is on the side of the cup 4 away from the closed end 3' of the inner ring 3. The center of the closed end 4' of the cup 4 has a recess 14. As illustrated in the figure, the material of the inner ring 3 may be deformed at the periphery of the flange thereof in order to hold the cup 4 in the inner ring.

The bearing 1 is further comprised of an outer ring 5 having a closed base 11 and an annular outer flange or shoulder 5' radially spaced outwardly of the flange of the inner ring. The flange or shoulder 5' of the outer ring 5 is coaxial with the inner ring, and is mounted to be axially slidable in the bore 2. The flange or shoulder 5' also extends axially beyond each end of the inner ring 3, with the closed base 11 thereof being adjacent and spaced from the closed base 3' of the inner ring. A ring 6 having an angular cross-section is inserted in the open end of the bearing ring 5, engaging the inner walls of the flange or shoulder 5', in order to hold the bearing structure together. The ring 6 may be forced in the outer bearing, or held in there by any other conventional technique.

An annular recess is formed in the base 11 of the outer ring in order to define a race 9, and similarly an annular recess is provided in the base of the inner ring 3, in order to define a race 8. A plurality of balls 7 are arranged to run in the races 8, 9, and a cage 10 is provided in conventional manner to space the balls from one another.

In accordance with the invention, the base 11 of the outer ring 5 is curved, with the curvature extending axially outwardly of the bearing, that is, the curvature being directed away from the rolling body. In other words, the center of curvature of the base 11 is on the side of the outer bearing ring 5 toward the rolling body assembly 7, 10 and lies substantially on the axis of the bearing ring 5.

The bearing rings 3 and 5 are preferably formed by a technique which does not involve the removal of material, for example, by drawing or spinning.

In the use of the bearing of the invention as a clutch throw-out bearing, as illustrated in the figure, a clutch lever 12 is mounted, for example, by a pivotal mount (not shown), to engage the base 11 of the bearing, in order to axially displace the bearing 1 in the bore 2. A push rod 13 is inserted in the recess 14 of the cup 4, and the push rod 13 is connected by conventional means (not shown) such as a diaphragm or a plate spring to a clutch (not shown). As a result, movement of the level 12 which effects the axial displacement of the bearing, effects also the engagement and disengagement of the clutch.

In accordance with the invention, by providing the closed base 11 of the outer ring 5 with a curved, preferably spherical, shape the stiffness of the outer ring is increased. Due to the use of the curved base 11, edge loading at the contact point thereof with adjoining machine parts avoids the danger of crack formation in the base of the bearing ring. In addition, a smaller tilting moment is produced by the axial displacement of the bearing due to eccentric application of force to the bearing. In addition, the provision of a curved base inhibits pivoting of the bearing in the event of misalignment between the point of application of the lever force with respect to the bearing axis of the bearing ring, at each application of the clutch disengagement force. Consequently, a greater wear surface is available, that is, the wear on the thrust bearing in accordance with the invention is, as a whole, minimized. The minimization of wear, of course, results in an increase in the useful life of the bearing.

While the invention has been disclosed and described with reference to a single embodiment thereof, it will be apparent that variations and modifications may be made therein. For example, the curved base of the bearing may be provided with a small bore to enable the forcing of a lubricating material into the bearing. It is intended in the following claims to cover each such variation and modification as falls within the true spirit and scope of the invention.

What is claimed is:

1. In a thrust bearing having thin-walled inner and outer rings, at least one of which has a closed end, and a rolling ball assembly between said rings; the improvement wherein said closed end is cup-shaped and curved, with the center of curvature of said closed end being on the side thereof toward said rolling ball assembly.

2. A thrust bearing of claim 1 wherein said inner ring is cup-shaped and has an annular outer flange, and said outer ring has an annular outer flange radially spaced and concentric with the flange of said inner ring, said inner and outer rings having closed ends, with the closed end of said outer ring being aligned and spaced from the closed end of said inner ring.

3. The thrust bearing of claim 2 wherein the closed ends of said inner ring and outer ring have annular bearing races, said balls being positioned to roll in said races.

4. The thrust bearing of claim 2 wherein said curved closed end of said thrust bearing comprises a closed end of said outer ring.

5. The thrust bearing of claim 2 wherein said curved closed end has a spherical shape.

6. The thrust ball bearing of claim 2 further comprising a cup coaxially fixed in said inner ring, said cup having a recess for receiving a push rod, and a ring having an angular cross-section affixed in the open end of said outer ring for holding said inner ring therein.

7. A thrust ball bearing comprising a thin-walled cup-shaped outer ring having an axially extending flange and a closed base, a thin-walled cup-shaped inner ring having an axially extending flange radially spaced from and coaxial with said flange of said outer ring and a closed base adjacent and axially spaced from said closed base of said outer ring, a bearing race in the facing sides of the closed bases of each of said inner and outer rings, a plurality of balls positioned to roll in said races, and a cage for holding said balls spaced apart from one another, said closed base of said outer ring being curved, with the center of curvature being on the side thereof toward said balls.

8. The thrust ball bearing of claim 7 wherein said races comprise annular recesses in said closed races of said inner and outer rings.

9. The thrust ball bearing of claim 7, wherein said center of curvature lies substantially on the axis of said outer ring.

10. A clutch ball bearing assembly comprising cup-shaped thin walled inner and outer rings having axially extending flanges, said inner and outer rings having open ends extending in the same direction, and closed ends spaced apart, with the axially extending flange of the outer ring extending over said inner ring and being radially spaced therefrom, annular bearing races in the facing sides of the closed bases of each of said inner and outer rings, a plurality of rolling elements positioned to roll in said races, a cage for holding said balls spaced apart from one another, said closed base of said outer ring being curved, with the center of curvature thereof being on the side thereof toward said balls, and further comprising a clutch lever engaging the outer surface of said closed end of said outer ring radially inwardly of the bearing race formed in said outer ring.

11. The assembly of claim 10, further comprising a cup coaxially fixedly mounted within said inner ring and having a central axially extending recess directed toward the closed end of said inner ring, and a push rod extending into said recess.

* * * * *